US006793842B2

(12) United States Patent
Akimoto et al.

(10) Patent No.: US 6,793,842 B2
(45) Date of Patent: Sep. 21, 2004

(54) SINGLE-CRYSTAL FERRITE FINE POWDER

(75) Inventors: Yuji Akimoto, Fukuoka (JP); Kazuro Nagashima, Ohnojo (JP); Masahiro Ikemoto, Dazaifu (JP); Minoru Takaya, Tokyo (JP); Yoshiaki Akachi, Tokyo (JP); Hisashi Kobuke, Tokyo (JP)

(73) Assignees: Shoei Chemical Inc., Tokyo (JP); TDK Corporation, Tokyo (JP)

(*) Notice: Subject to any disclaimer, the term of this patent is extended or adjusted under 35 U.S.C. 154(b) by 283 days.

(21) Appl. No.: 09/900,769

(22) Filed: Jul. 6, 2001

(65) Prior Publication Data

US 2002/0017628 A1 Feb. 14, 2002

(30) Foreign Application Priority Data

Jul. 7, 2000 (JP) .................................... 2000-207171

(51) Int. Cl.$^7$ ........................ C01G 49/02; C01G 49/08; C04B 35/26

(52) U.S. Cl. ................................ 252/62.56; 252/62.57; 252/62.58; 252/62.59; 252/62.6; 252/62.61; 423/594.1; 423/594.2

(58) Field of Search ........................... 252/62.56, 62.57, 252/62.58, 62.59, 62.6, 62.61; 423/594, 595, 596, 633, 594.1, 594.2

(56) References Cited

U.S. PATENT DOCUMENTS

| | | | | | |
|---|---|---|---|---|---|
| 3,710,438 | A | * | 1/1973 | Max et al. | 29/603.08 |
| 4,226,843 | A | * | 10/1980 | Watanabe et al. | 423/594.2 |
| 4,263,374 | A | * | 4/1981 | Glass et al. | 428/693 |
| 4,336,242 | A | | 6/1982 | Schmidberger et al. | 423/594 |
| 4,972,233 | A | * | 11/1990 | Yamazaki et al. | 399/347 |
| 5,078,085 | A | * | 1/1992 | Fuji et al. | 399/236 |
| 5,240,803 | A | * | 8/1993 | Ota | 430/108.3 |
| 5,688,430 | A | | 11/1997 | Matsuzaki et al. | |
| 5,736,111 | A | | 4/1998 | Saegusa | 423/594 |
| 5,800,835 | A | * | 9/1998 | Zastrow et al. | 424/647 |
| 5,919,490 | A | * | 7/1999 | Zastrow et al. | 424/647 |
| 5,959,513 | A | * | 9/1999 | Parrott et al. | 333/219.2 |
| 6,309,627 | B1 | * | 10/2001 | Golz-Berner et al. | 424/59 |
| 6,492,016 | B1 | * | 12/2002 | Lauf et al. | 428/329 |

FOREIGN PATENT DOCUMENTS

| | | | |
|---|---|---|---|
| EP | 0 394 020 B1 | | 10/1990 |
| EP | 0 481 670 A2 | | 4/1992 |
| JP | 47-11550 | | 4/1972 |
| JP | 63-17776 | | 4/1988 |
| JP | 11-80818 | | 3/1993 |
| JP | 05-341603 | | 12/1993 |
| JP | 09/048618 | | 2/1997 |
| JP | 09-169523 | | 6/1997 |
| WO | WO 95/03061 | * | 2/1995 |

OTHER PUBLICATIONS

"Development of Ferrite Raw Powder Production Process with Thermal Decomposition of Iron and Manganese Chloride Solution by Spray Roaster" (Journal of the Japan Society of Powder and Powder Metallurgy vol. 45, No. 7, p. 624–629).

* cited by examiner

*Primary Examiner*—Joseph D. Anthony
(74) *Attorney, Agent, or Firm*—Flynn, Thiel, Boutell & Tanis, P.C.

(57) ABSTRACT

A ferrite fine powder having a mean particle size of 0.1 to 30 μm and made of spherical single-crystal particles. The ferrite fine powder has superior physical properties and excellent magnetic properties desirable for use as a raw material for a dust core of coils, transformers, etc. The powder is prepared by forming a solution or suspension containing a compound or compounds of at least one of the metals forming the ferrite into fine droplets, and thermally decomposing the droplets at elevated temperatures.

3 Claims, 12 Drawing Sheets

SELECTED-AREA ELECTRON DIFFRACTION OF SINGLE-CRYSTAL Mn-Zn FERRITE POWDER

Mn-Zn FERRITE
(COMPARISON OF EXAMPLE 1 AND COMPARATIVE EXAMPLE 1)

Mn-Zn FERRITE (a)

(b)

Mn-Zn FERRITE
(COMPARISON OF EXAMPLE 2 AND COMPARATIVE EXAMPLE 1)

SELECTED-AREA ELECTRON DIFFRACTION OF SINGLE-CRYSTAL Ni-Zn FERRITE POWDER

Ni-Zn FERRITE
(COMPARISON OF EXAMPLE 3 AND COMPARATIVE EXAMPLE 2)

Ni-Zn FERRITE (a)

(b)

Ni-Zn FERRITE
(COMPARISON OF EXAMPLE 4 AND COMPARATIVE EXAMPLE 2)

SINGLE-CRYSTAL FERRITE FINE POWDER

BACKGROUND OF THE INVENTION

1. Field of the Invention

The present invention relates to a spherical, single-crystal ferrite powder which has excellent magnetic properties.

2. Description of the Related Art

Spinel or magnetoplumbite ferrite represented by the general formula $MFe_2O_4$ or $MFe_{12}O_{19}$ (where M is one or more bivalent metal ions), as well as ferrite represented by $M'_3Fe_5O_{12}$ (where M' is a trivalent metal ion) and lithium ferrite represented by $Li_{0.5}Fe_{2.5}O_4$ are used in a variety of applications as magnetic materials having excellent magnetic properties.

For example, soft ferrites such as $Fe_3O_4$, $NiFe_2O_4$, $MnFe_2O_4$, $(Ni,Zn)Fe_2O_4$, $(Mn,Zn)Fe_2O_4$ and $CoFe_2O_4$ are used as soft magnetic materials where high magnetic permeability, low coercive force and low loss are required, as in cores of inductors, transformers, and filters; magnetic head cores; magnetic shielding materials; etc., and they are also used as magnetostrictive materials. $\gamma$-$Fe_2O_3$ and barium ferrite, etc., which have great crystal magnetic anisotropy, are used as permanent magnet materials and high-density magnetic recording materials.

Ferrite powders having a variety of properties are used as the raw materials for these applications, but a truly spherical and fine single-crystal ferrite powder with excellent magnetic properties within the desired range of particle sizes has not been known until now.

For example, the most widely used ferrite powders are manufactured by the solid phase reaction (sintering) method wherein oxides or carbonates of constituent metals are mixed and subjected to prolonged heat treatment at temperatures in excess of one thousand and several hundreds degrees C., and the resulting composite oxides are pulverized. However, ferrite powders obtained by this method are highly aggregated polycrystalline powders in irregular shape. Although it is possible to pulverize them finely until they are substantially single-crystal powder, they are then angular and nonuniform in shape. For example, while the manufacture by sintering of a magnetoplumbite ferrite single-crystal powder is described in Japanese Patent Application Laid-open No. 9-48618 (U.S. Pat. No. 5,736,111), it is an angular, polyhedral powder with a variety of shapes.

The spray roasting methods described in Japanese Patent Publication No. 47-11550 and 63-17776 and Tatsushiro Ochiai's "Development of Ferrite Raw Powder Production Process with Thermal Decomposition of Iron and Manganese Chloride solution by Spray Roaster" (Journal of the Japan Society of Powder and Powder Metallurgy Vol. 45, No. 7, p. 624) produce fine ferrite powders by spraying and thermal decomposition of solutions or suspensions of the raw materials, which are chlorides, oxides, nitrates, etc. of the component metals. Ordinarily this thermal decomposition reaction takes place at temperatures below 1000° C., and the resulting ferrite powder is a polycrystalline powder in polyhedral or nonuniform shape. Depending on the conditions, it may become spherical, but has a low crystallinity.

Neither are there any reports of manufacturing spherical and single-crystal fine powder by wet methods such as hydrothermal synthesis or by vapor phase reaction. In particular, while it is possible to manufacture ultrafine powder by the vapor phase reaction method, spherical and single-crystal fine powder with a mean particle size of about 0.1 to 30 $\mu$m is not known to have been obtained.

Moreover, Japanese Patent Application Laid-open 9-169523 describes a ferrite fine powder with a mean particle size of 0.1 $\mu$m or more manufactured by vapor phase epitaxy, wherein the ratio of the saturation magnetization value of the powder to the saturation magnetization value of the fired product is 70% or more. After being molded by a variety of molding methods, this ferrite fine powder is further fired to achieve the final magnetic properties and used, or is used as an intermediate raw material. This fine powder is manufactured by spraying of an aqueous metal chloride solution in a combustion flame, evaporation of the metal chloride as the raw material in a process of thermal decomposition at temperatures not higher than 1000° C., and vapor phase epitaxy of spinel single crystals around nuclei of iron oxide deposited in the vapor phase; as described, it involves complex process control resulting in fine particles with good magnetic properties and a mean particle size of about 0.1 $\mu$m. As with the vapor phase reaction method mentioned above, however, it is difficult with this method to grow large particles while maintaining their spherical shape and the state of single-crystal particles, and it is not possible to obtain spherical, single-crystal fine powder with a mean particle size of 0.1 to 30 $\mu$m, or in particular 0.3 to 30 $\mu$m.

There is also the technology of melting ferrite, making bulk single-crystal product from the liquid phase and producing single-crystal spheres through grinding it into a spherical shape, but such spheres have limited use because they are large, generally 0.5 mm or more.

Control of the physical properties of the ferrite powder which is the raw material is vital in the manufacture of magnetic bodies. For example, the soft ferrite used in cores of coils and transformers needs to have a low coercive force (Hc) in order to minimize drive magnetic fields, as well as a low hysteresis and good linearity in its magnetization curve. In recent years, moreover, improvements in the electrical and magnetic properties of magnetic materials, such as higher magnetic permeability, decreased loss and improved frequency characteristics, are required in order to produce better inductance and high-frequency characteristics. Therefore, it is extremely important that the magnetic properties of ferrite powder by improved, along with physical properties such as shape, particle size and reactivity. Specifically, there is a demand for spherical fine powders which have a single-crystal structure relatively unaffected by grain boundaries and impurities, which do not aggregate, and which are highly dispersible and packable.

Specifically, when manufacturing sintered cores and permanent magnets by molding and sintering processes, if the raw material is a polycrystalline powder with a nonuniform shape, localized abnormal crystal growth and heterogeneous composition tend to occur, and it is impossible to obtain a dense, high-performance ferrite sintered body with excellent magnetic properties and mechanical strength. On the other hand, when ferrite powder is compacted with polymer materials such as resin and gum in the manufacture of dust cores, for example, in order to obtain a final product with good magnetic properties without molding followed by sintering, it is important that the powder itself have excellent magnetic properties, that it can be dispersed uniformly in order to minimize variation in its properties, and that the packing density can be enhanced. To this end, a spherical, single-crystal powder with a mean particle size of 0.1 to 30 $\mu$m, and particularly 0.3 to 30 $\mu$m, which does not aggregate, which is fine and uniform in shape and particle size and which has low surface activity would seem to be ideal.

In the past, however, no powder fulfilled all of these requirements, so there were limits to improving the magnetic properties.

SUMMARY OF THE INVENTION

With the foregoing in view, it is an object of the present invention to provide a novel ferrite fine powder having superior powder physical properties and magnetic properties not found in existing magnetic materials. In particular, a ferrite fine powder is provided which has superior properties as a raw material for ferrite sintered bodies or a material for a dust core, which has high dispersibility and packablity, and which also has magnetic properties suitable for high-frequency applications.

The present invention provides a ferrite fine powder which consists of spherical single crystal particles having a mean particle size of 0.1 to 30 μm. Moreover, the present invention provides a spherical, single-crystal ferrite fine powder with a mean particle size of 0.1 to 30 μm and a sphericity in the range of 0.95 to 1. Still further, the present invention provides a spherical, single-crystal ferrite fine powder with a mean particle size of 0.1 to 30 μm manufactured by spray pyrolysis.

DESCRIPTION OF THE PREFERRED EMBODIMENTS

Figure 1:
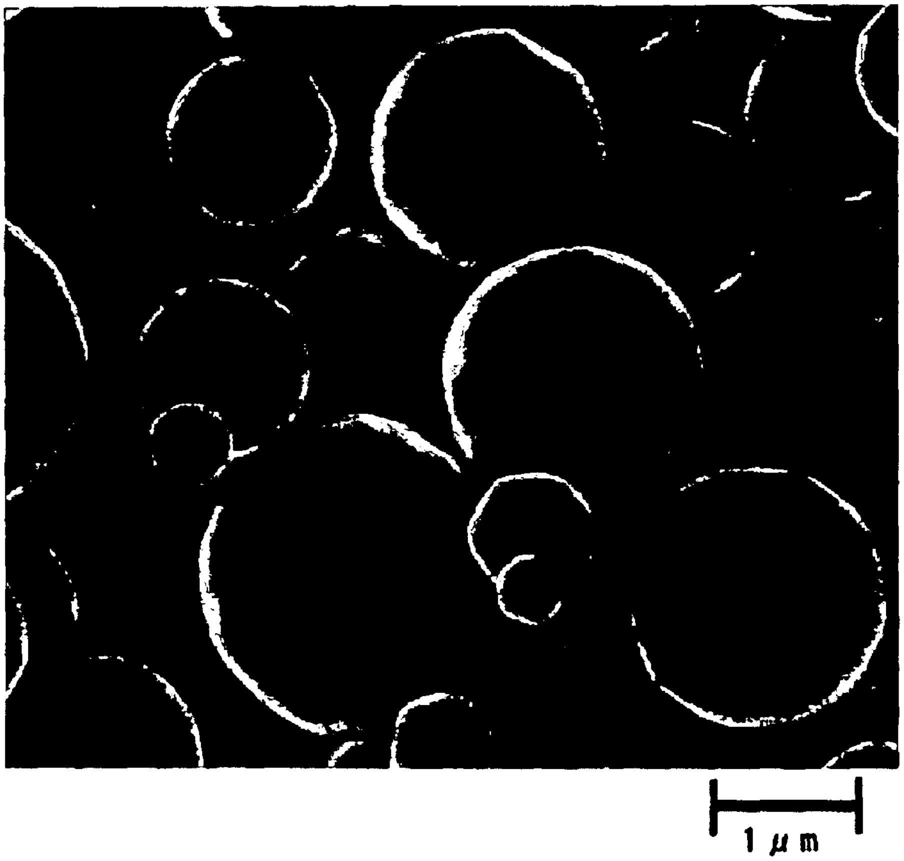
FIG. 1 is an FE-SEM (field emission-scanning electron microscope) photograph of the ferrite fine powder of the present invention obtained in Example 1.

The ferrite of the present invention is an iron oxide or a composite oxide containing iron and a metal or metals other than iron. There are no particular restrictions on the metal composing the ferrite together with iron, as long as it is one normally used in ferrites: possibilities include nickel, zinc, manganese, magnesium, strontium, barium, cobalt, copper, lithium and yttrium. The ferrite of the present invention also includes solid solutions of two or more ferrites.

Some typical ferrites are $Fe_3O_4$, $NiFe_2O_4$, $MnFe_2O_4$, $CuFe_2O_4$, $(Ni,Zn)Fe_2O_4$, $(Mn,Zn) Fe_2O_4$, $(Mn,Mg)Fe_2O_4$, $CoFe_2O_4$ and $Li_{0.5}Fe_{2.5}O_4$, etc.

The term "spherical" in the present invention includes not only perfect spheres with smooth surfaces, but also polyhedrons which are extremely close to a true-spherical shape. That is, the spherical fine powder of the present invention includes polyhedral particles with isotropic symmetry surrounded by stable crystal facets as represented in the Wulff model, which also have a sphericity close to 1. The term "sphericity" in the present invention refers to Wadell's practical sphericity, expressed as the ratio of the diameter of a circle corresponding to the projected area of the particle to the diameter of the smallest circle that circumscribes the projected image of the particle, and a preferable sphericity according to the invention is in the range of 0.95 to 1. If the sphericity is less than 0.95, uniform dispersion of the powder will be difficult when forming the powder into compacts (e.g., dust cores), resulting in irregular magnetic properties, etc. Accordingly, it is impossible to attain the desired characteristics.

The mean particle size of the ferrite fine powder of the present invention is in the range of 0.1 to 30 μm. When the mean particle size is smaller than this particle size range, it is difficult to ensure a high compacting density. In particular, when the mean particle size is 0.3 μm or more, it is possible to achieve a high compacting density (green density) in the manufacture of compacted powder bodies (green compacts) without employing special molding techniques such as hydrostatic isotropic pressing, for example. This is desirable because it allows improvements in the magnetic properties of the green compacts, especially in the magnetic permeability, to be achieved relatively easily.

It is profitable to manufacture the ferrite fine powder of the present invention by spray pyrolysis. Namely, a solution or suspension containing a compound or compounds of at least one of the metals forming the ferrite is formed into fine droplets, and the droplets heated to roughly 1400° C. or more, thermally decomposing the metal compound(s) and resulting in a single-crystal ferrite powder which has a mean particle size of about 0.1 to 30 μm, is extremely close to a true-spherical shape, and has a uniform particle size, without aggregation. Annealing can also be applied as desired. The particle size of the resulting powder can be easily controlled by process control of the spraying conditions, etc. Although the heating temperature has to be adjusted depending on the composition, a temperature of lower than 1400° C. makes it impossible to achieve spherical, single-crystal powder. In order to obtain a single-crystal powder with higher sphericity, thermal decomposition should take place in the vicinity of the melting point of the desired ferrite or higher temperatures. Using this method, it is specifically possible to manufacture a spherical, single-crystal ferrite fine powder wherein the mean particle size is about 0.3 to 30 μm, and the sphericity of the individual particles is 0.95 to 1.

For the starting metal compounds, suitable thermal decomposable compounds can be selected and used, including nitrates, sulfates, chlorides, carbonates, ammonium salts, phosphates, carboxylates, metal alcoholates and resinates of the metals forming the ferrite as well as double salts, complex salts and oxide colloids thereof. These compounds are dissolved or suspended in water or organic solvents such as alcohol, acetone or ether or a solvent mixture of the above, and the resultant solution or suspension are formed into fine droplets with an ultrasonic atomizer, two fluid nozzle type atomizer or the like. For the atmosphere during thermal decomposition, an oxidizing atmosphere, reducing atmosphere or inert atmosphere can be selected as necessary depending on the type of ferrite desired.

EXAMPLES

Next, the present invention is explained in detail with examples and comparative examples.

Example 1

Iron nitrate nonahydrate, manganese nitrate hexahydrate and zinc nitrate hexahydrate were mixed at a mole ratio, in terms of their oxides, of $Fe_2O_3$:MnO:ZnO=52:38:10, and the mixture was dissolved in water to give a molar concentration, in terms of ferrite composite, of 1 mole/l. Thus, a raw material solution was obtained. This solution was converted to fine droplets using an ultrasonic atomizer, and supplied through a ceramic pipe heated to 1600° C. in an electric furnace, with nitrogen as a carrier gas. The droplets were thermally decomposed through a heating zone, resulting in a ferrite composite oxide fine powder containing manganese and zinc. The flow volume of the carrier gas was used to adjust the dwell time of the droplets or resulting powder in the heating zone to about 1 to 10 seconds.

Figure 2:
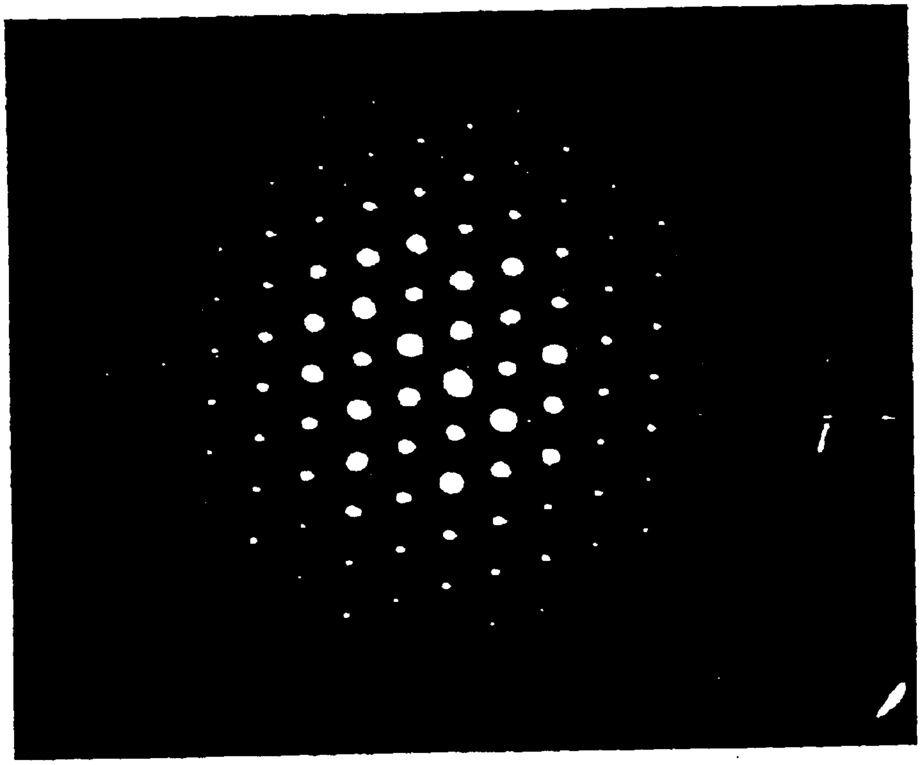
FIG. 2 is an electron beam diffraction diagram of the ferrite fine powder of the present invention obtained in Example 1.

The composition of the resulting powder was investigated using a fluorescent X-ray spectrometer, as shown in Table 1. As analyzed, the zinc component was rather small, probably because of the loss during the thermal decomposition at high temperatures which was caused due to the high vapor pressure of the zinc component. Identification with an X-ray diffractometer revealed the sharp diffraction line of a single spinel phase. Observation with an FE-SEM showed no aggregation of the powder, which consisted of fine, nearly true-spherical particles with a particle size of about 0.1 to 10 μm, with the sphericity being about 1 and the mean particle size about 1.5 μm. Detailed observation of individual particles revealed single-crystal particles with no grain boundaries therein, and facets of crystal faces which were symmetrical across the entire surface of the particle. An FE-SEM photograph of the powder is shown in FIG. 1. When the crystal structure was investigated by TEM electron beam diffraction, the regular structure peculiar to a single crystal was confirmed as shown in the photograph in FIG. 2.

Figure 3:
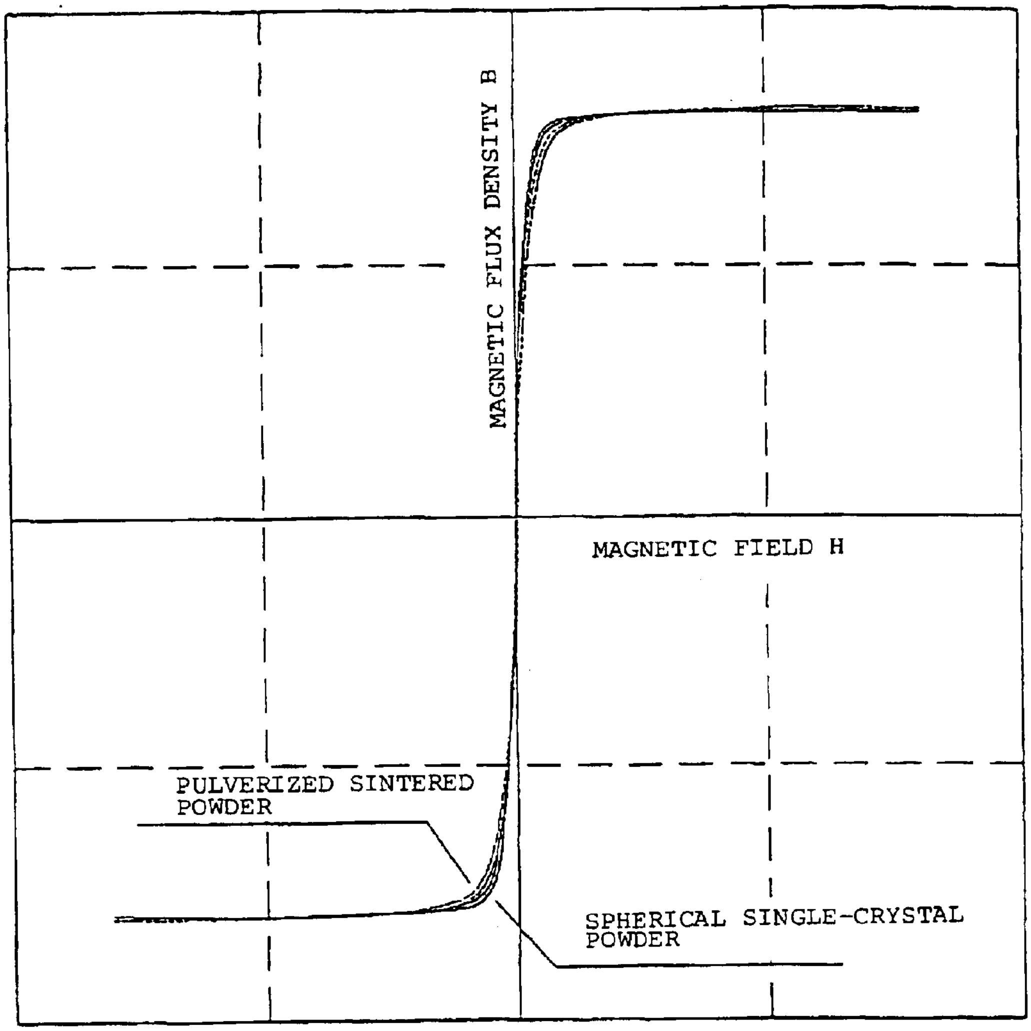
FIG. 3 shows the hysteresis curves of the ferrite powder of the present invention obtained in Example 1 and the conventional pulverized ferrite powder obtained in Comparative Example 1.
Figure 4:
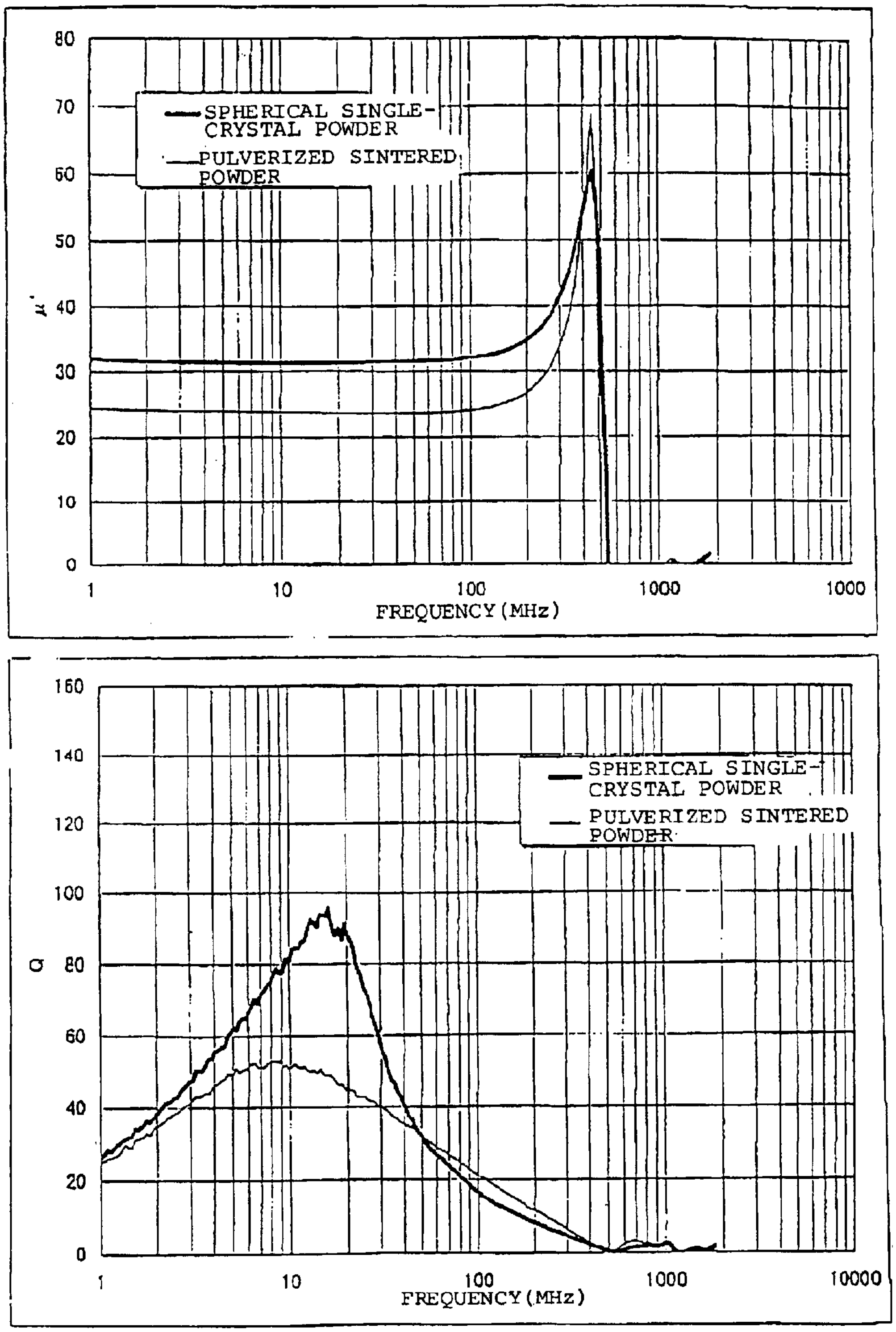
FIG. 4(*a*) is a graph showing changes caused by frequency in the relative magnetic permeability (μ') of the cores obtained in Example 1 and Comparative Example 1, and FIG. 4(*b*) is a graph showing the changes caused by frequency in Q.

Next, in order to study the magnetic properties of the powder, saturation magnetic flux density (Bs), coercive force (Hc) and hysteresis curve were measured with a vibration magnetometer. The results are shown in Table 1 and FIG. 3. 10% by weight of water was also added to the powder, and the powder was then pressure molded in a metal mold to produce a ring-shaped core with an outer diameter of 23.5 mm, an inner diameter of 11.6 mm and a height of 4.5 mm. After drying the core for 2 hours at 100° C., a wire was wound three times around the core, and the relative magnetic permeability (μ') and the frequency characteristics of Q (=1/tan δ) were measured. The results are shown in FIGS. 4(*a*) and (*b*), respectively.

Comparative Example 1

Figure 5:
FIG. 5 is an SEM (scanning electron microscope) photograph of the conventional ferrite powder obtained in Comparative Example 1.

A ferrite composite oxide containing manganese and zinc with the same composition as Example 1 was produced by the solid phase reaction method (sintering method), and pulverized to obtain a fine powder with a mean particle size of about 2.5 μm. As shown in an SEM photograph of FIG. 5, this powder (hereinafter, called "pulverized powder") had a nonuniform irregular shape, and consisted of polycrystalline particles with a very broad particle size distribution. The results of an analysis of the composition by fluorescent X-ray analysis and measurements of Bs and Hc with a vibration magnetometer are shown in Table 1. The hysteresis curve is also shown in FIG. 3. A ring-shaped core was also prepared as in Example 1, and the frequency characteristics of μ' and Q were measured, with the results shown in FIGS. 4(*a*) and 4(*b*).

Comparing the magnetic properties of Example 1 and Comparative Example 1, the spherical single-crystal powder of Example 1 has a coercive force about 30% less than that of the pulverized powder of Comparative Example 1, even though the saturation magnetic flux density is no different. That is, in the present invention hysteresis loss is low, and a low drive magnetic field is possible. Comparing the hysteresis curves, there is obviously greater linearity with the spherical single-crystal powder. Moreover, in Example 1 it is clear that μ' and Q have been greatly enhanced without sacrificing the frequency characteristics.

Compared to the powder of Example 1, the powder of Comparative Example 1 tended to aggregate because of its high surface activity, and could not be successfully filled into a resin.

Example 2

A ferrite composite oxide fine powder containing manganese and zinc was manufactured in the same way as in Example 1, except that air was used as the carrier gas.

As in Example 1, the resulting powder had a true-spherical shape, with a mean particle size of about 1.5 μm and a sphericity of about 1, and was confirmed by electron beam diffraction to be single-crystalline.

Figure 6:
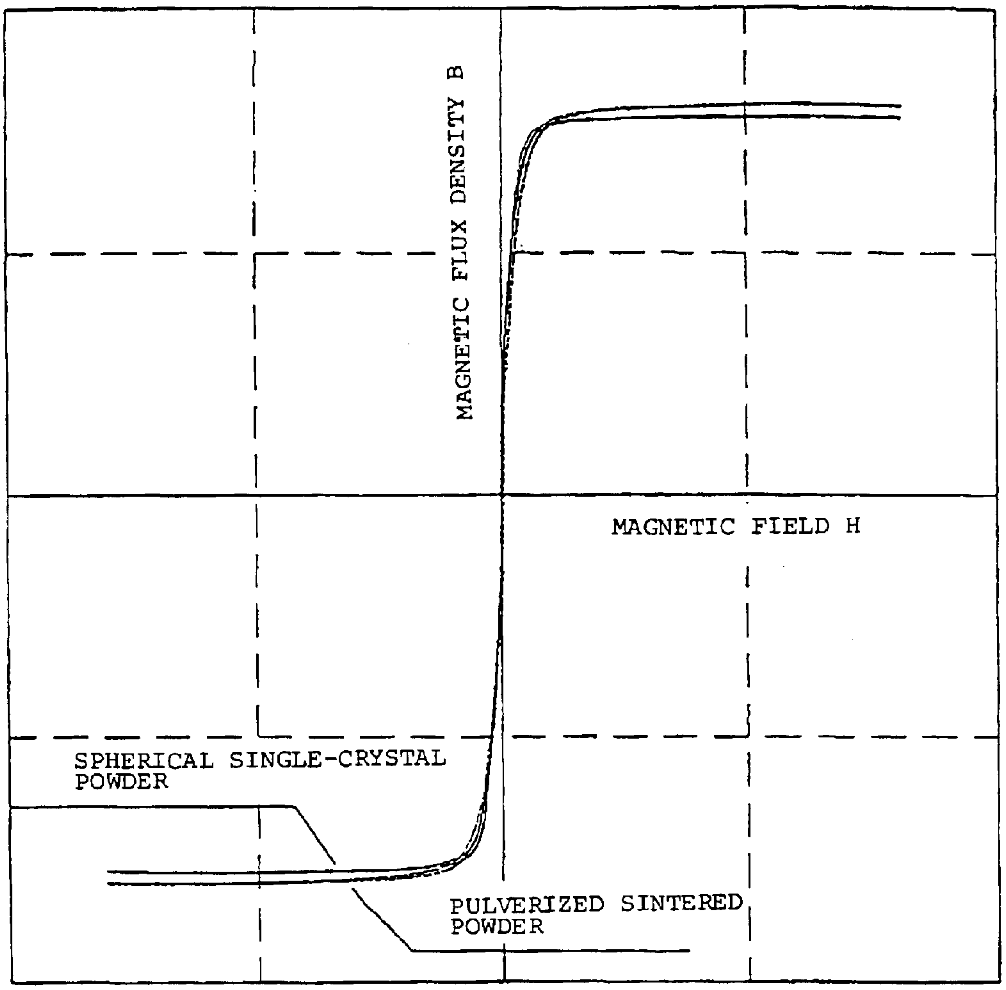
FIG. 6 shows the hysteresis curves of the ferrite powder of the present invention obtained in Example 2 and the conventional pulverized ferrite powder obtained in Comparative Example 1.

The composition of the powder and Bs, Hc and the hysteresis curve were then investigated as in Example 1, with the composition, Bs and Hc shown in Table 1, and the hysteresis curve in FIG. 6. The hysteresis curve of the pulverized powder of Comparative Example 1 is also shown in FIG. 6 for purposes of comparison.

TABLE 1

| | Example 1 | Example 2 | Comparative Example 1 |
|---|---|---|---|
| Composition (mol. %) | | | |
| $Fe_2O_3$ | 52.6 | 52.5 | 52.8 |
| MnO | 40.6 | 40.1 | 38.0 |
| ZnO | 6.8 | 7.4 | 10.0 |
| Saturation magnetic flux density Bs (G) | 3970 | 3880 | 4005 |
| Coercive force Hc (Oe) | 0.071 | 0.073 | 0.108 |

Example 3

Iron nitrate nonahydrate, nickel nitrate hexahydrate and zinc nitrate hexahydrate were mixed to an oxide conversion mole ratio of about $Fe_2O_3$:NiO:ZnO=49:23:28, and the mixture were dissolved in water to a concentration, in terms of ferrite composite oxide, of 1 mole/l to form a raw material solution. This solution was formed into fine droplets using an ultrasonic atomizer, and a ferrite composite oxide fine powder containing nickel and zinc was manufactured in the same way as Example 1, except that air was used as the carrier gas.

Figure 7:
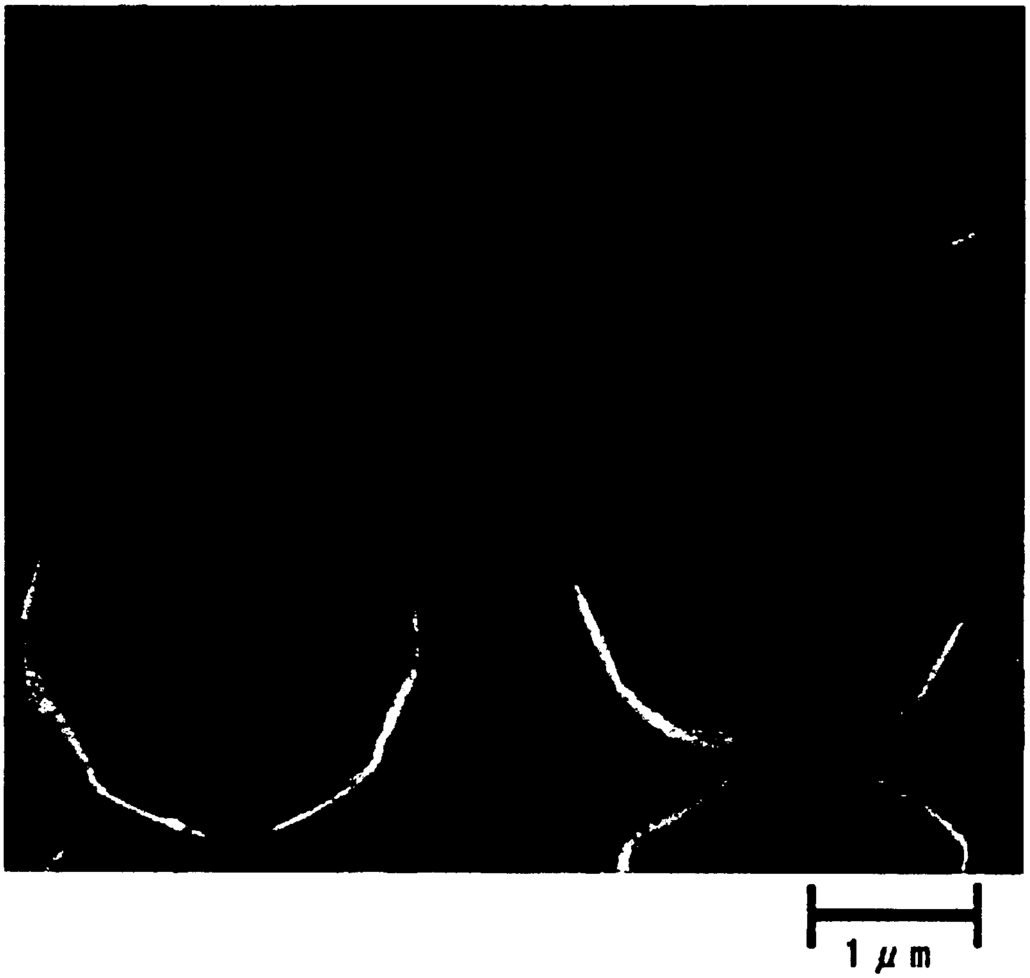
FIG. 7 is an FE-SEM photograph of the ferrite fine powder of the present invention obtained in Example 3.
Figure 8:
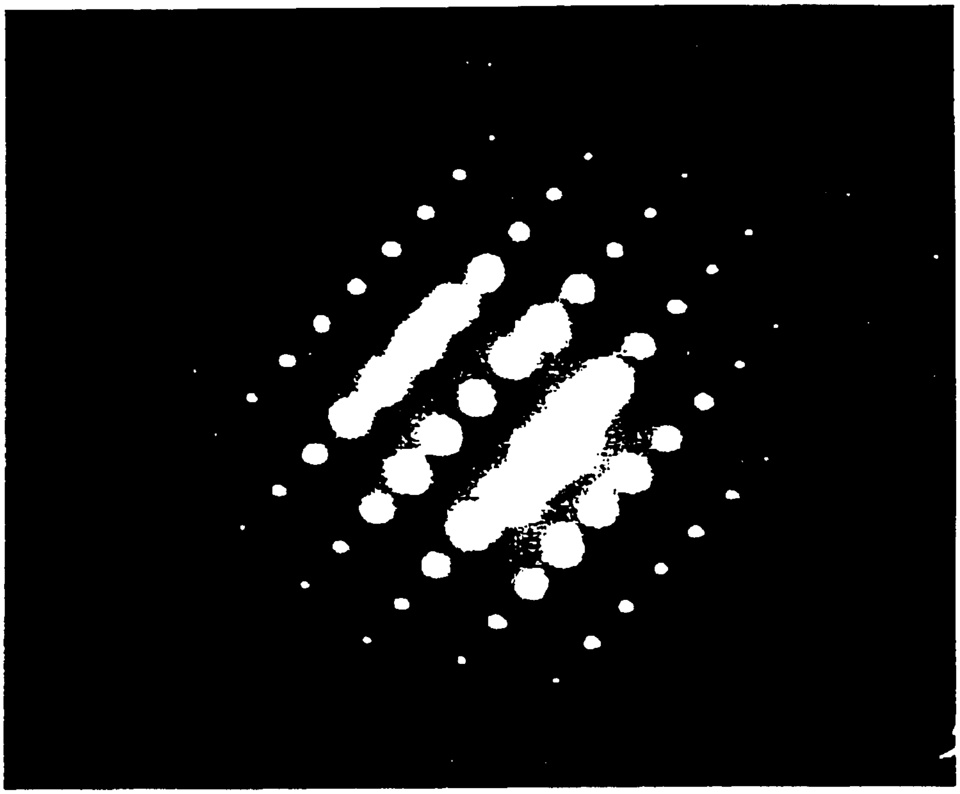
FIG. 8 is an electron diffraction diagram of the ferrite fine powder of the present invention obtained in Example 3.

As shown in the FE-SEM photograph in FIG. 7, although the facets on the surface of the resulting powder were somewhat developed in comparison with Example 1, it was still a spherical, single-crystal fine powder with a particle size of about 0.1 to 10 μm. The mean particle size was about 1.5 μm and sphericity about 0.98. Analysis of the crystal structure of the powder by TEM electron beam diffraction confirmed the regular structure peculiar to single crystals, as shown in the photograph in FIG. 8.

Figure 9:
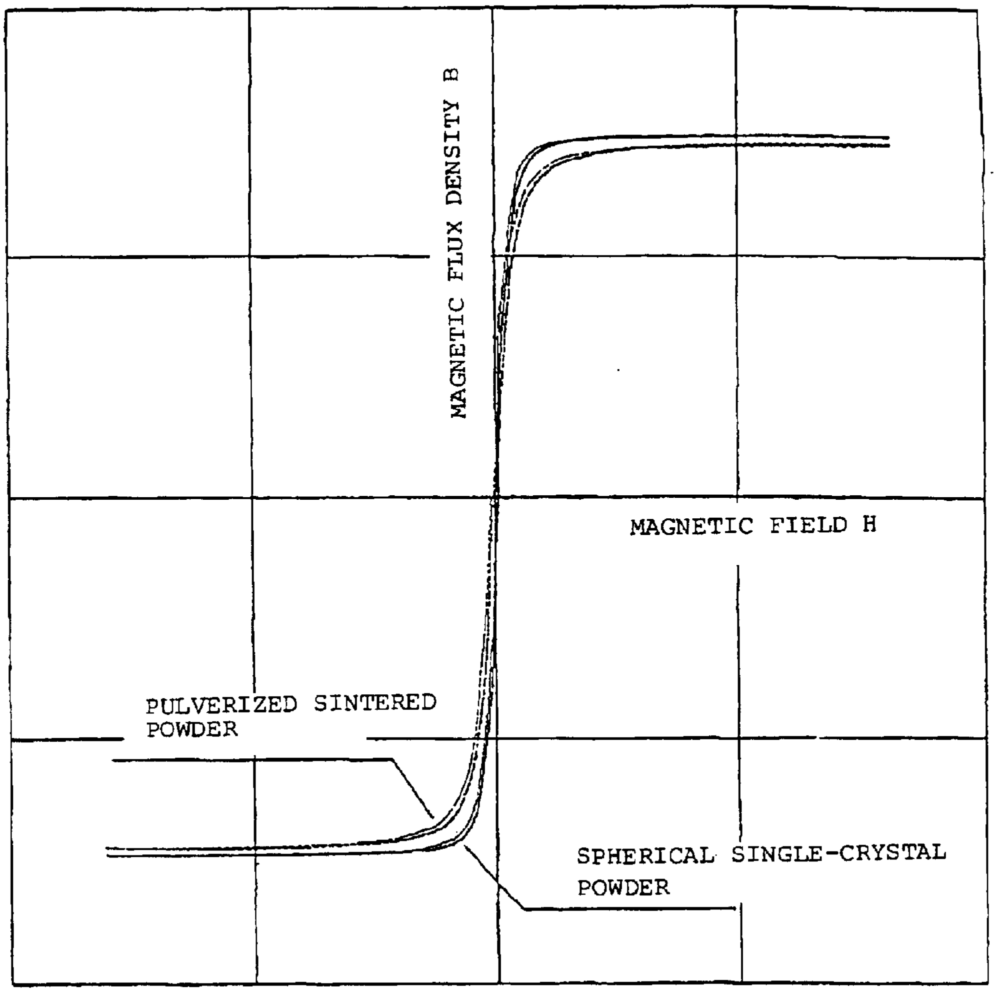
FIG. 9 shows hysteresis curves of the ferrite powder of the present invention obtained in Example 3 and of the conventional ferrite pulverized powder obtained in Comparative Example 2.
Figure 10:
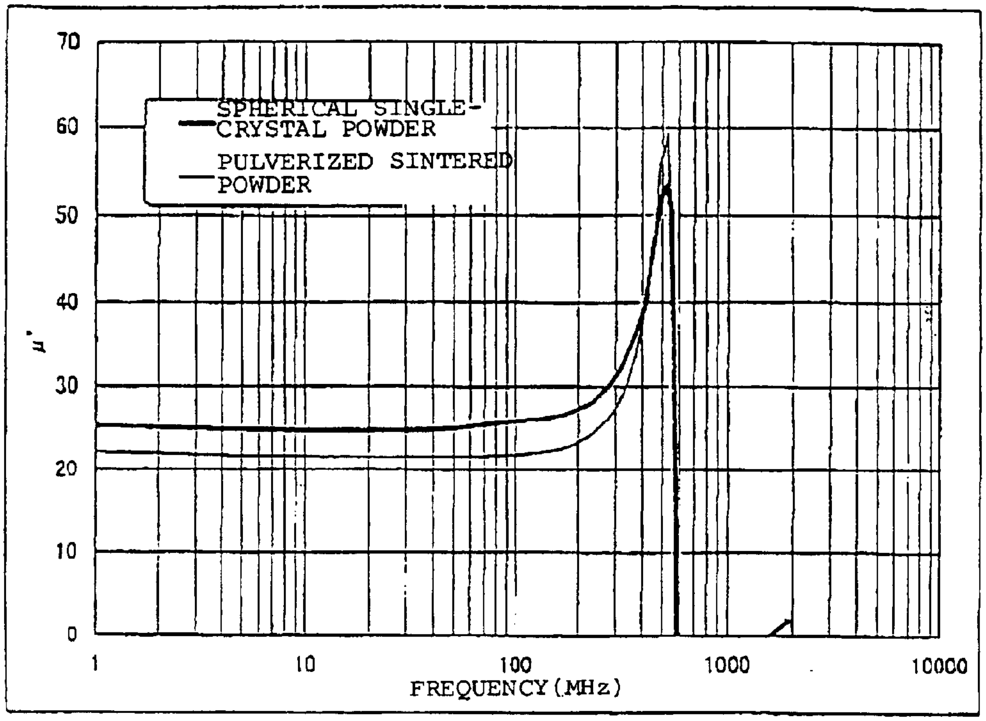
FIG. 10(*a*) is a graph showing the changes caused by frequency in the relative magnetic permeability (μ') of the cores obtained in Example 3 and Comparative Example 2, while FIG. 10(*b*) is a graph showing changes caused by frequency in Q.
Figure 10:
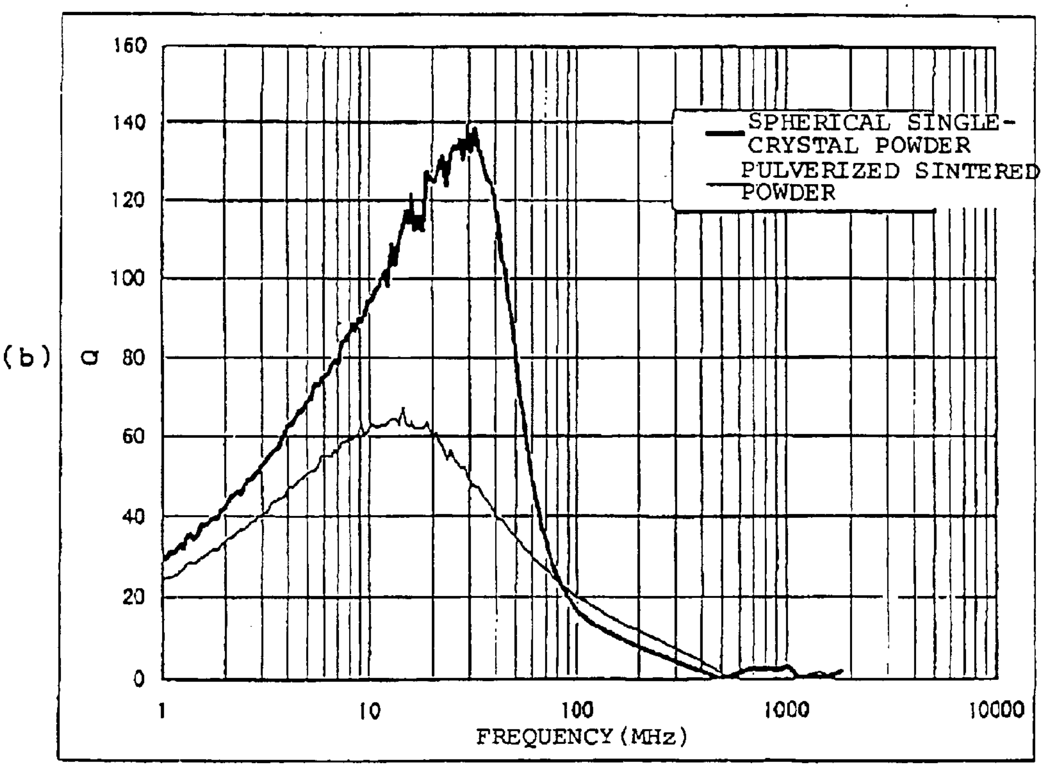

Next, the composition and magnetic properties were investigated as in Example 1. The results are shown in Table 2 for composition, Bs and Hc, in FIG. 9 for hysteresis curve, and in FIGS. 10(*a*) and (*b*) for the frequency characteristics of μ' and Q of a dust core made of the powder.

Comparative Example 2

A ferrite composite oxide containing nickel and zinc such as that in Example 3 was prepared by the solid phase reaction method, and pulverized to obtain a powder with a mean particle size of about 2.5 μm. This pulverized powder consisted of polycrystalline powder having a nonuniform irregular shape with a broad particle size distribution. The composition and magnetic properties were studied as in Example 3 with the results shown in Table 2, FIG. 9 and FIGS. 10(*a*) and (*b*).

It is obvious from comparing the magnetic properties of Example 3 and Comparative Example 2 that the spherical single-crystal powder had a coercive force about 20% lower than that of the pulverized powder, and a better linearity in hysteresis curve. μ' and Q were also greatly improved in Example 3.

Example 4

A ferrite composite oxide fine powder containing nickel and zinc was produced as in Example 3, except that the proportions of iron nitrate nonahydrate, nickel nitrate hexahydrate and zinc nitrate hexahydrate were, in terms of oxide mole ratio, roughly $Fe_2 03$:NiO:ZnO=59.5:28:12.5.

The resulting powder was spherical with a mean particle size of about 1.5 μm, a sphericity of about 0.98, and a single-crystal structure as confirmed by electron beam diffraction.

Figure 11:
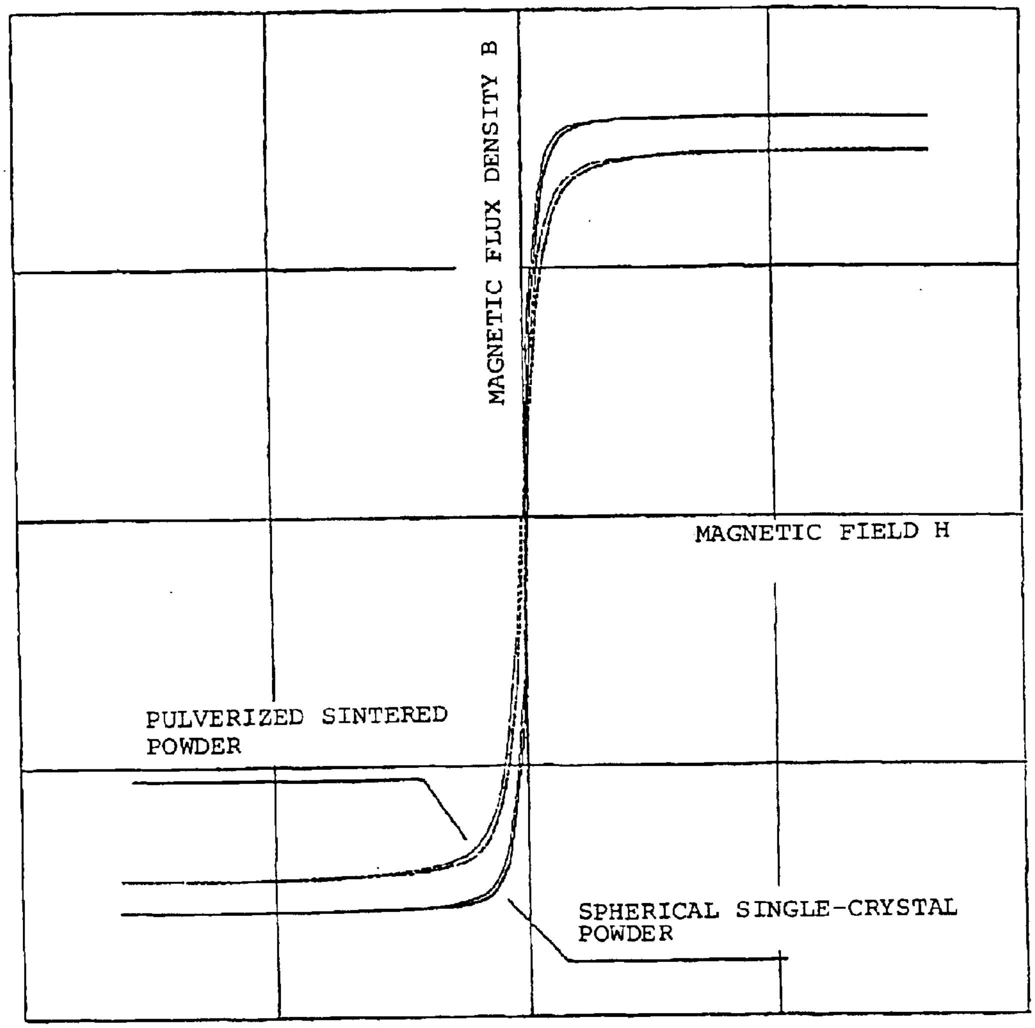
FIG. 11 shows hysteresis curves of the ferrite fine powder of the present invention obtained in Example 4 and the conventional pulverized ferrite powder obtained in Comparative Example 2.

Next, the composition of the powder and Bs, Hc and the hysteresis curve were studied as in Example 3, with the composition and Bs and Hc shown in Table 2 and the hysteresis curve in FIG. 11. The hysteresis curve of the pulverized powder of Comparative Example 2 is also shown in FIG. 11 for purposes of comparison.

TABLE 2

| | Example 2 | Example 4 | Comparative Example 2 |
|---|---|---|---|
| Composition (mol. %) | | | |
| $Fe_2O_3$ | 50.3 | 61.3 | 49.3 |
| NiO | 27.0 | 26.8 | 23.2 |
| ZnO | 22.7 | 11.9 | 27.5 |
| Saturation magnetic flux density Bs (G) | 3700 | 3950 | 3630 |
| Coercive force Hc (Oe) | 0.076 | 0.082 | 0.095 |

Example 5

A $Fe_3O_4$ fine powder was prepared as in Example 1, except that iron nitrate nonahydrate was used alone as the raw material compound, and the carrier gas was nitrogen.

Figure 12:
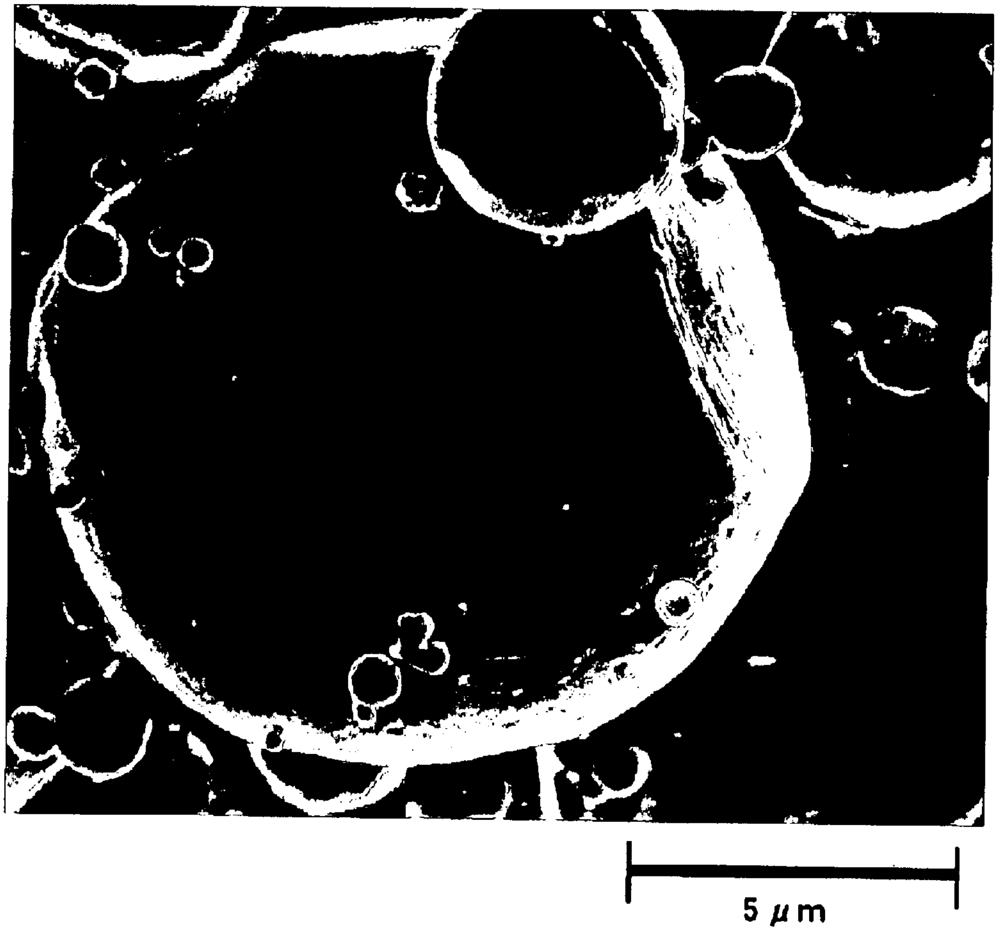
FIG. 12 is an FE-SEM photograph of the ferrite fine powder of the present invention obtained in Example 5.

The resulting powder was a spherical, single-crystal powder with a mean particle size of 10 μm and a sphericity of 0.97. An FE-SEM photograph is shown in FIG. 12.

The novel single-crystal ferrite fine powder of the present invention is far superior to prior art in the powder physical properties, namely its shape and surface condition; in terms of electromagnetic properties, great improvements were also achieved in magnetic permeability and loss, and it is extremely useful as a magnetic material.

That is, dust cores made by compression of the spherical, single-crystal ferrite fine powder of the present invention have greater inductance values than those made with the cores using the conventional pulverized powder when used as the dust cores of coils and transformers, and also show a significantly reduced loss within a wide frequency range.

Further, the powder of the present invention has an excellent dispersibility in a dispersion medium such as a resin and can be packed with a high packing density. Even when used as a raw material in sintered bodies, it is superior because it makes it possible to obtain a homogenous and high-density sintered body.

What is claimed is:

1. A ferrite fine powder having a mean particle size of 0.3 to 30 μm and consisting of spherical single-crystal particles.

2. The ferrite fine powder claimed in claim 1, obtained by spray pyrolysis.

3. A ferrite fine powder having a mean particle size of 0.3 to 30 μm and consisting of spherical single-crystal particles having a sphericity in the range of 0.95 to 1.

* * * * *